United States Patent
Lee et al.

(10) Patent No.: US 8,531,855 B2
(45) Date of Patent: Sep. 10, 2013

(54) POWER CONVERSION APPARATUS

(75) Inventors: Kyungsoo Lee, Kunitachi (JP); Yosuke Nakazawa, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 58 days.

(21) Appl. No.: 13/368,593

(22) Filed: Feb. 8, 2012

(65) Prior Publication Data

US 2012/0212985 A1 Aug. 23, 2012

(30) Foreign Application Priority Data

Feb. 17, 2011 (JP) .................................. 2011-032087

(51) Int. Cl.
*H02M 7/44* (2006.01)

(52) U.S. Cl.
USPC .............. 363/97; 363/124; 363/131; 323/906

(58) Field of Classification Search
USPC ................ 363/95, 97, 98, 124, 131; 323/906
See application file for complete search history.

(56) References Cited

U.S. PATENT DOCUMENTS

| 7,248,946 | B2 * | 7/2007 | Bashaw et al. | 700/286 |
| 7,719,866 | B2 * | 5/2010 | Boldo | 363/89 |
| 2012/0075898 | A1 * | 3/2012 | Sigamani et al. | 363/131 |

FOREIGN PATENT DOCUMENTS

| JP | 2000020150 A | * | 1/2000 |
| JP | 2001255949 A | * | 9/2001 |

OTHER PUBLICATIONS

Kobayashi, et al. A Study on a Two Stage Maximum Power Point Tracking Control of a Photovoltaic System under Partially Shaded Insolation Conditions, Jul. 13-17, 2003, Power Engineering Society General Meeting, 2003, IEEE (vol. 4).*

Elrayyah, et al. Control of Microgrid-Connected PV-Sources, Oct. 7-11, 2012, Industry Applications Society Annual Meeting (IAS), 2012 IEEE, pp. 1-8.*
Dragicevic, et al. Supervisory Control of an Adaptive-Droop Regulated DC Microgrid with Battery Management Capability, Power Electronics, IEEE Transactions on (vol. PP , Issue: 99), p. 1.*
Majumder, et al. Operation and Control of a Microgrid Containing Inertial and Non-Inertial Micro Sources, Jan. 23-26, 2009, TENCON 2009—2009 IEEE Region 10 Conference, pp. 1-6.*
Liu, et al. Comparison of P&O and Hill Climbing MPPT Methods for Grid-Connected PV Converter, Industrial Electronics and Applications, 2008. ICIEA 2008. 3rd IEEE Conference on, Jun. 3-5, 2008, pp. 804-807.*
Ahmed et. al, Perturbation Parameters Design for Hill Climbing MPPT Techniques, Industrial Electronics (ISIE), 2012 IEEE International Symposium on, May 28-31, 2012, pp. 1819-1824.*
Sera et al. Optimized Maximum Power Point Tracker for Fast-Changing Environmental Conditions, Industrial Electronics, 2008. ISIE 2008. IEEE International Symposium on, Jun. 30-Jul. 2, 2008, pp. 2401-2407.*
Jung-Won Kim et al; "A Novel Droop Method for Converter Parallel Operation"; IEEE Transactions on Power Electronics, vol. 17, No. 1, Jan. 2002; p. 25.

* cited by examiner

*Primary Examiner* — Gary L Laxton
*Assistant Examiner* — Alex Torres-Rivera
(74) *Attorney, Agent, or Firm* — Holtz, Holtz, Goodman & Chick, PC (57) ABSTRACT

According to one embodiment, an apparatus includes a controller which outputs a signal for controlling ON and OFF of a switch which changes over connection between a second input terminal and the output end of a coil. The controller includes an MPPT control unit which follows a maximum power point with a period based on a zero-cross detection signal of a system voltage based on an input signal acquired by subtracting a value obtained by multiplying a droop gain simulating drooping characteristics, a control unit which outputs a direction value in such a manner that a difference between a reference output from the MPPT control unit and the input signal becomes zero, and a PWM comparator which outputs a PWM signal based on the direction value and a triangular wave voltage.

10 Claims, 4 Drawing Sheets

POWER CONVERSION APPARATUS

CROSS-REFERENCE TO RELATED APPLICATIONS

This application is based upon and claims the benefit of priority from prior Japanese Patent Application No. 2011-032087, filed Feb. 17, 2011, the entire contents of which are incorporated herein by reference.

FIELD

Embodiments described herein relate generally to a power conversion apparatus.

BACKGROUND

In recent years, power generation facilities which do no discharge greenhouse effect gases at the time of power generation and utilize recyclable energy are installed, and a reduction of carbon in a power supply system is examined. There has been examined supply of power based on interconnection of a dispersed power source such as a photovoltaic system, a wind turbine generator system, or a fuel cell system with an electric power system. When the dispersed power source is interconnected with the electric power system, a power conversion apparatus that converts power output from the dispersed power system in synchronization with the system is required.

This power conversion apparatus is configured to have the same capacity as that of the dispersed power source. When a place where the dispersed power source is installed is limited or a capacity of the single power conversion apparatus is not the same as a capacity of the dispersed power source, the power conversion apparatuses are connected in parallel to obtain a predetermined capacity. In parallel operations of the power conversion apparatuses, there is a method of transmitting a control timing or a direction value from a master device serving as a benchmark to a slave device using a communicating function and operating the master device and the slave device in synchronization with each other.

DETAILED DESCRIPTION

In general, according to one embodiment, a power conversion apparatus comprises a first input terminal connected to a positive electrode of a direct-current power source; a second input terminal connected to a negative electrode of the direct-current power source; a first output terminal electrically connected to the first input terminal; a second output terminal electrically connected to the second input terminal; a coil connected between the first input terminal and the first output terminal in series; a diode connected in a forward direction from an output end of the coil to the first output terminal; a switch which changes over connection between the second input terminal and the output end of the coil; a capacitor connected between the first output terminal and the second output terminal; a controller which outputs a signal for controlling ON and OFF of the switch; and a DC-AC inverter unit which converts direct-current power output from each of the first output terminal and the second output terminal into alternating-current power and outputs the alternating-current power. The controller comprises an MPPT control unit which follows a maximum power point with a period based on a zero-cross detection signal of a system voltage based on an input signal acquired by subtracting a value obtained by multiplying a droop gain simulating drooping characteristics; a control unit which outputs a voltage direction value in such a manner that a difference between a reference output from the MPPT control unit and the input signal becomes zero; and a PWM comparator which outputs a PWM signal based on the voltage direction value and a triangular wave voltage.

A power conversion apparatus according to the embodiment will now be described hereinafter with reference to the drawings.

Figure 1:
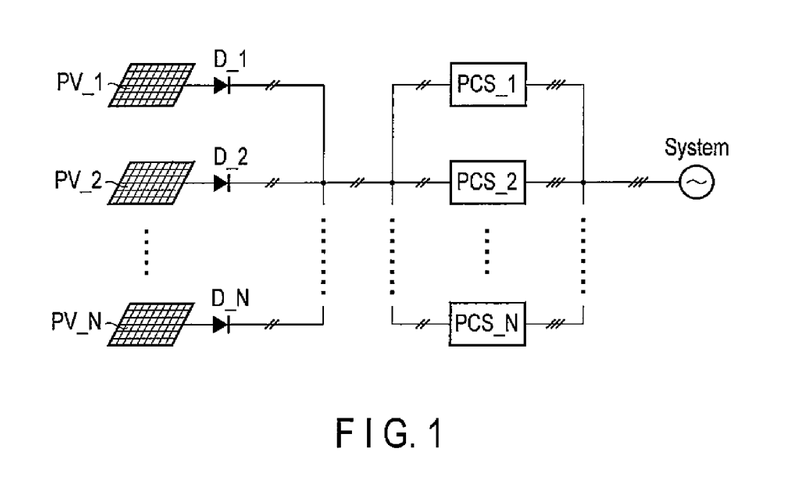
FIG. 1 is a view showing an example where power conversion apparatuses according to an embodiment are connected in parallel.

FIG. 1 shows an example in which power conversion apparatuses according to a first embodiment are connected in parallel and used. Each power conversion apparatus according to this embodiment is a power conversion apparatus of a dispersed power source. In FIG. 1, N power conversion apparatuses PCS_1 to PCS_N are connected in parallel.

Direct-current power from N photovoltaic arrays PV_1 to PV_N connected in parallel as direct-current power sources is input to the N power conversion apparatuses PCS_1 to PCS_N. Diodes D_1 to D_N configured to avoid an adverse current are connected to output terminals of the respective photovoltaic arrays PV. Output terminals of the N power conversion apparatuses PCS_1 to PCS_N are collectively connected to an electric power system.

Figure 2:
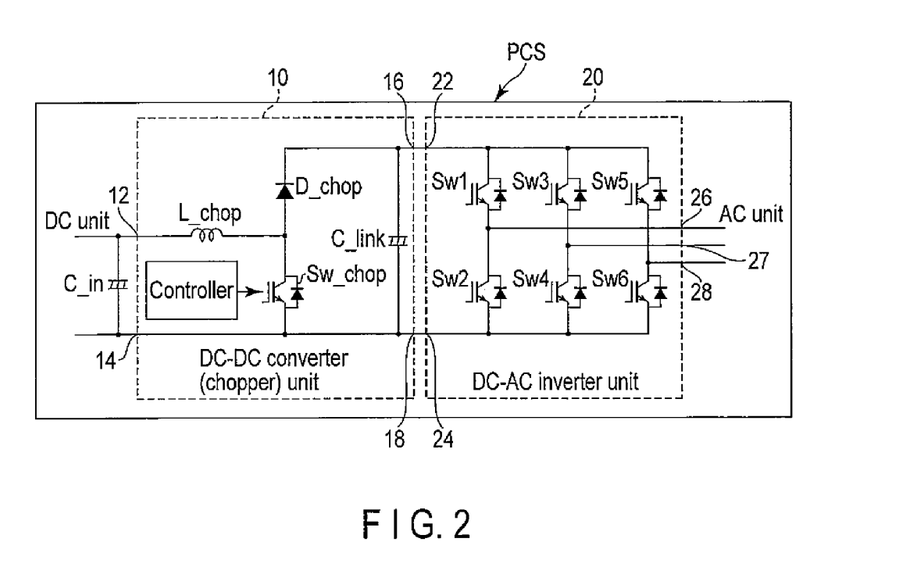
FIG. 2 is a view schematically showing a structural example of the power conversion apparatus depicted in FIG. 1.

FIG. 2 shows a structural example of the power conversion apparatus PCS. The power conversion apparatus PCS comprises a DC-DC converter (a chopper) unit 10 to which the direct-current power is supplied and a DC-AC converter unit 20 which converts the direct-current power into alternating-current power and outputs the converted power.

The DC-DC converter unit 10 is a boost converter that boosts and outputs a direct-current input voltage from the dispersed power source in order to perform power conversion while being interconnected with an electric power system. The DC-AC inverter unit 20 converts the direct-current input voltage and a direct-current input current into three-phase voltage and current and outputs the converted voltage and current.

The DC-DC converter unit 10 includes a first input terminal 12 electrically connected to positive output terminals of the photovoltaic arrays PV_1 to PV_N, a second input terminal 14 electrically connected to negative output terminals, a first output terminal 16 electrically connected to the first input terminal 12, a second output terminal 18 electrically connected to the second input terminal 14, a coil connected between the first input terminal 12 and the first output terminal 16 in series, a diode connected in a forward direction from an output end of the coil to the first output terminal 16, a switch that changes over connection achieved between the second input terminal 14 and the output end of the coil, a capacitor connected between the first output terminal 16 and the second output terminal 18, and a controller which outputs a signal for controlling ON and OFF of the switch.

The first input terminal 12 and the second input terminal 14 are connected to each other through a capacitor C_in. The first input terminal 12 is connected to the first output terminal 16 through a choke L_chop and a diode D_chop, and the first output terminal 16 is electrically connected to a third input terminal 22 of the DC_AC inverter unit 20. The diode D_chop is connected to face a forward direction from the choke coil L_chop to the first output terminal 16.

A wiring line between the second input terminal 14 and the second output terminal 18 is connected to an input end of the diode D_chop (an output end of the choke coil L_chop) and a switch Sw_chop, and it is further connected to an output end of the diode D_chop through a capacitor C_link. The second output terminal 18 is electrically connected to a fourth input terminal 24 of the DC_AC inverter unit 20.

The switch Sw_chop includes a source terminal, a drain terminal, and a drain terminal, and connection between the source terminal and the drain terminal is controlled by a signal applied to the drain terminal. The DC-DC converter unit 10 includes a controller which outputs a PWM signal for controlling a gate terminal potential in the switch Sw_chop.

When the switch Sw_chop is electrically conductive (ON), a current flows from the first input terminal 12 to the second input terminal 14 through the choke coil L_chop. When the switch Sw_chop is not electrically conductive (OFF), the current flows from the first input terminal 12 to the first output terminal 16 through the choke coil L_chop.

Further, energy is stored in the choke coil L_chop by currents flowing in from the photovoltaic arrays PV_1 to PV_N when a source electrode and a drain electrode of the switch Sw_chop are electrically conductive (ON), and the energy stored in the choke coil L_chop is discharged and added to voltages input from the photovoltaic arrays PV_1 to PV_N to be output to the DC-AC inverter unit 20 when the source electrode and the drain electrode of the switch Sw_chop are not electrically conductive (OFF).

The DC-AC inverter unit 20 includes two input terminals 22 and 24 and three output terminals 26, 27, and 28. A switch Sw1 is interposed between the third input terminal 22 and the third output terminal 26. A switch Sw3 is interposed between the third input terminal 22 and the fourth output terminal 27. A switch Sw5 is interposed between the third input terminal 22 and the fifth output terminal 28. A switch Sw2 is interposed between the fourth input terminal 24 and the third output terminal 26. A switch Sw4 is interposed between the fourth input terminal 24 and the fourth output terminal 27. A switch Sw6 is interposed between the fourth input terminal 24 and the fifth output terminal 28.

Figure 3:
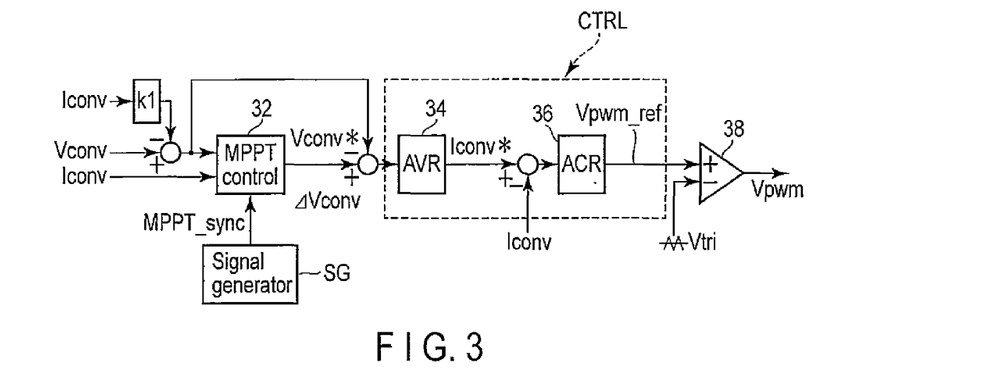
FIG. 3 is a block diagram for explaining a structural example of a controller of a DC-DC converter unit in the power conversion apparatus according to a first embodiment.

FIG. 3 shows an example of a control block of a controller which controls a gate terminal potential of the switch Sw_chop in the DC-DC converter unit 10. The control block depicted in FIG. 3 comprises an MPPT control unit 32 which receives a direct-current voltage (a converter input voltage Vconv−k1×Iconv) and a converter input current Iconv, a control unit CTRL including a voltage control unit (AVR: Automatic Voltage Regulator) 34 which performs PI control and a current control unit (ACR: Automatic Current Regulator) 36 which performs PI control, and a PWM comparator 38.

An MPPT timing signal MPPT_sync is input to the MPPT control unit 32 to synchronize an operation of the MPPT control. It is to be noted that the converter input voltage Vconv is an output voltage from each of the photovoltaic arrays PV_1 to PV_N, and the converter input current Iconv is an output current from each of the photovoltaic arrays PV_1 to PV_N.

Figure 4:
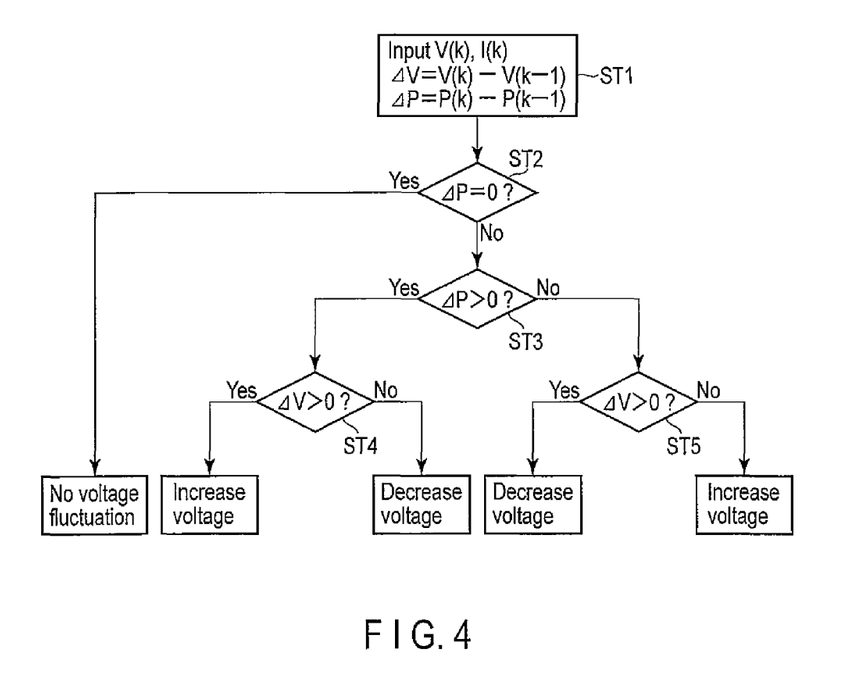
FIG. 4 is a flowchart for explaining an example of MPPT (Maximum Power Point Tracker) control which is called a hill-climbing method.

FIG. 4 is a flowchart for explaining an example of the MPPT control which is called a hill-climbing method. The hill-climbing method is a method generally used in a photovoltaic system which is a dispersed power source, and it is a method of searching for a reference voltage so that output power from a photovoltaic array becomes maximum with an open voltage being determined as an initial value.

First, an input direct-current voltage and a converter input current Iconv are detected, and a direct-current voltage error $\Delta V(=V(k)-V(k-1))$ and a direct-current power error $\Delta P(=P(k)-P(k-1))$ for each MPPT period are calculated (a step ST1).

Subsequently, whether the direct-current power error $\Delta P$ is zero is judged (a step ST2), and it is determined that the voltage does not fluctuate when the direct-current power error $\Delta P$ is zero. When the direct-current power error $\Delta P$ is not zero, whether the direct-current power error $\Delta P$ is larger than zero is judged (a step ST3).

When the direct-current error $\Delta P$ is larger than zero, whether the direct-current voltage error $\Delta V$ is larger than zero is further judged (a step ST4). When the direct-current voltage error $\Delta V$ is larger than zero, the voltage is increased. When the direct-current voltage error $\Delta V$ is not larger than zero, the voltage is decreased.

When the direct-current power error $\Delta P$ is not larger than zero at the step ST3, whether the direct-current voltage error $\Delta V$ is larger than zero is further judged (a step ST5). When the direct-current voltage error $\Delta V$ is larger than zero, the voltage is decreased. When the direct-current voltage error $\Delta V$ is not larger than zero, the voltage is increased.

The MPPT control unit 32 senses the converter input voltage Vconv and the converter input current Iconv, outputs the direct-current voltage error $\Delta V$ and the direct-current power error $\Delta P$ for each MPPT period, increases or decreases the reference voltage or determines no fluctuation of the reference voltage depending on magnitudes of these output errors, and outputs a reference voltage Vconv* based on a judgment result.

Figure 5:
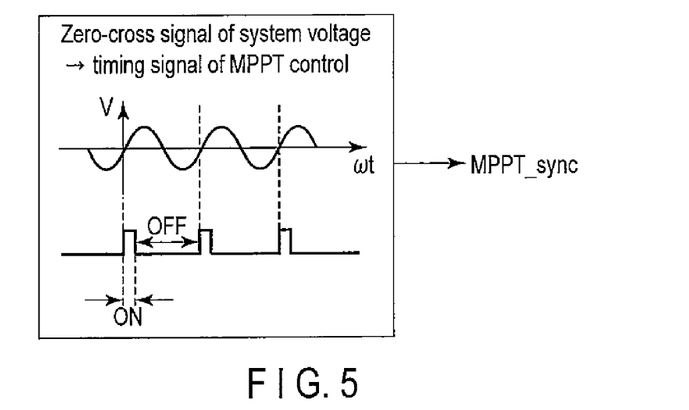
FIG. 5 is a view for explaining an example of an MPPT timing signal synchronized with the MPPT control.

FIG. 5 is a view for explaining an example of an MPPT timing signal MPPT_sync serving as a reference of the MPPT period during which the MPPT control is performed. In this embodiment, a system voltage of the electric power system is detected, and a timing at which this system voltage becomes zero (zero cross) is detected, and a pulse that changes from the zero cross to a high level (ON) for a predetermined period is generated and used as the MPPT timing signal MPPT_sync.

When the signal synchronized with the system voltage of the electric power system is adopted as the MPPT timing signal MPPT_sync, the MPPT control unit 32 can synchronously operate even though the power conversion apparatuses are connected in parallel. Therefore, each power conversion apparatus does not have to be provided with a communicating function, a complicated configuration can be avoided, and each power conversion apparatus can independently operate.

Figure 6:
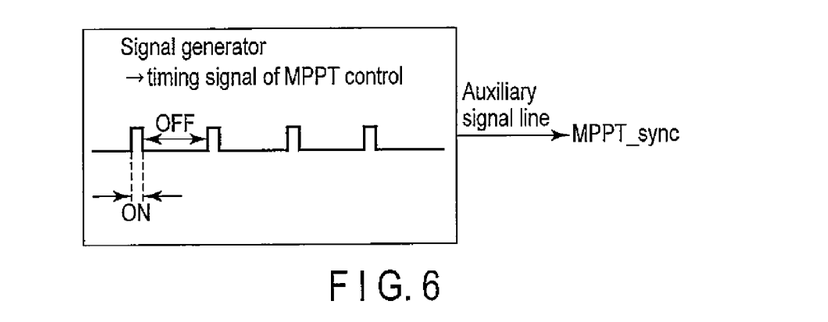
FIG. 6 is a view for explaining another example of the MPPT timing signal synchronized with the MPPT control.

FIG. 6 is a view for explaining another example of the MPPT timing signal MPPT_sync serving as a reference for the MPPT period during which the MPPT control is effected. In an example shown in FIG. 6, a pulse that provides the MPPT timing signal MPPT_sync is generated by a signal generator SG.

The signal generator SG may be mounted in one of the power conversion apparatuses PCS_1 to PCS_N connected in parallel, and it is connected to the other power conversion apparatuses through an auxiliary signal line (not shown). For example, when the system voltage cannot be detected from the electric power system due to a failure in the electric power system, e.g., power outage, a pulse generated by the signal generator SG is used as the MPPT timing signal MPPT_sync.

When the MPPT timing signal MPPT_sync generated by the signal generator SG can be supplementarily used in this manner, the operation can be continued without stopping the power conversion apparatuses PCS_1 to PCS_N even though the electric power system has a failure. It is to be noted that the auxiliary signal line connected between the power conversion apparatuses PCS_1 to PCS_N in this case does not require a complicated configuration since communication does not have to be performed through this line. Therefore, when transmitting the MPPT timing signal MPPT_sync from the power conversion apparatus having the signal generator SG mounted therein to another power conversion apparatus, the configuration of each power conversion apparatus is not complicated, and a cost is not increased.

The direct-current voltage input to the MPPT control unit 32 is a direct-current voltage acquired by subtracting a value, which is obtained by multiplying the converter input current Iconv by a resistance equivalent value (droop gain) k1, from the converter input voltage Vconv. The resistance equivalent value k1 is a value simulating a resistance connected to the input end of the power conversion apparatus in series.

That is, when the direct-current voltage acquired by subtracting from the converter input voltage Vconv the value acquired by multiplying the converter input current Iconv by the resistance equivalent value k1 is input to the MPPT control unit 32 in this manner, the control is equivalent to that in a configuration where a resistor is connected to the input end of the power conversion apparatus, and the resistor actually does not have to be connected.

Therefore, power loss can be prevented from being produced by the resistor connected to the input end of the power conversion apparatus, power generated by each photovoltaic array can be more efficiently utilized, and the balance of the current flowing through each power conversion apparatus can be adjusted similarly to a configuration in which an actual resistor were disposed. It is to be noted that different values can be set to the individual power conversion apparatuses as the resistance equivalent value k1.

The reference voltage Vconv* output from the MPPT control unit is subtracted by the direct-current voltage (Vonev−k1×Iconv) input to the MPPT control unit 32, and a resultant voltage is input to the voltage control unit 34.

Based on an input voltage difference value (Vconv*−(Vconv−k1×Iconv)), the voltage control unit 34 outputs a reference current Iconv* by which this difference becomes zero. The converter input current Iconv is subtracted from the reference current Iconv* output from the voltage control unit 34, and a resultant current is input to the current control unit 36.

Based on an input difference value (Iconv*−Iconv), the current control unit 36 controls in such a manner that this difference becomes zero and outputs a voltage direction value Vpwm_ref for the PWM comparator 38.

The PWM comparator 38 compares the voltage direction value Vpwm_ref output from the current control unit 36 with a triangular wave voltage Vtri and outputs a PWM signal Vpwm of a predetermined duty ratio. The PWM signal Vpwm is applied to the gate electrode of the switch Sw_chop of the DC-DC converter unit 10 depicted in FIG. 1.

That is, adjusting the duty ratio of the PWM signal Vpwm enables adjusting an ON period of the switch Sw_chop, and a value of the direct-current voltage output to the DC-AC inverter unit 20 can be adjusted by effecting boosting in the DC-DC converter unit 10.

As described above, according to the power conversion apparatus of this embodiment, it is possible to provide the power conversion apparatus that can be independently operated in parallel.

A power conversion apparatus according to a second embodiment will now be described with reference to the drawings. It is to be noted that, in the following description, like reference numerals denote structures equal to those in the power conversion apparatus according to the first embodiment to omit explanation thereof. The power conversion apparatus according to this embodiment is different from the first embodiment in a control block that controls a gate terminal potential of a switch Sw_chop of a DC-DC converter unit 10.

Figure 7:
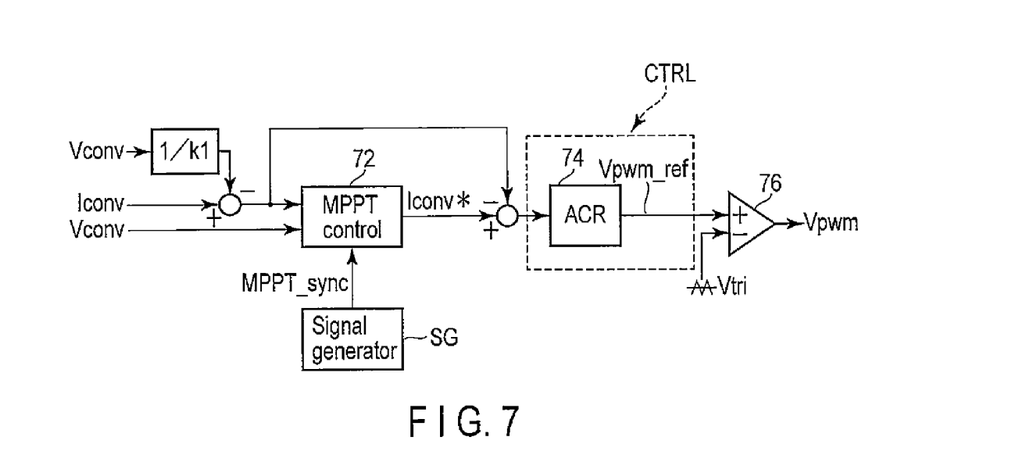
FIG. 7 is a block diagram for explaining a structural example of a controller of a DC-DC converter unit in a power conversion apparatus according to a second embodiment.

FIG. 7 shows an example of a control block that controls a gate terminal potential of the switch Sw_chop in the DC-DC converter unit 10. The control block depicted in FIG. 7 comprises an MPPT control unit 72 which receives a direct current (a converter input current Iconv−Vconv/k1) and a converter input voltage Vconv, a control unit CTRL including a current control unit (ACR: Automatic Current Regulator) 74 which performs PI control, and a PWM comparator 76.

An MPPT timing signal MPPT_sync is input to the MPPT control unit 72. The MPPT timing signal MPPT_sync adopted in this embodiment is generated from a zero-cross signal of a system voltage like the first embodiment.

Therefore, like the first embodiment, since the signal synchronized with the system voltage of the electric power system is adopted as the MPPT timing signal MPPT_sync, the MPPT control unit 72 can synchronously operate even if the power conversion apparatuses are connected in parallel. Therefore, the power conversion apparatus does not have to be provided with a communicating function, a complicated configuration can be avoided, and the individual power conversion apparatuses can independently operate.

Furthermore, in case the system voltage cannot be obtained due to, e.g., a failure of the electric power system, the signal generator SG may be configured to be capable of generating the MPPT timing signal MPPT_sync. In this case, like the first embodiment, the power conversion apparatuses are connected through the auxiliary signal line, and the MPPT timing signal MPPT_sync output from the signal generator SG is input to all the power conversion apparatuses connected in parallel.

The MPPT control unit 72 outputs the reference current Iconv*. That is, in this embodiment, in the MPPT control executed with the MPPT period, a direct-current error $\Delta I(=I(k)-I(k-1))$ and a direct-current power error $\Delta P$ are calculated, and it is determined that the current does not fluctuate when the direct-current power error $\Delta P$ is zero. In cases where the direct-current power error is larger than zero, whether the direct-current error $\Delta I$ is larger than zero is judged, the current is increased when the direct-current error $\Delta I$ is larger than zero, and the current is decreased when the direct-current error $\Delta I$ is not larger than zero. In cases where the direct-current power error $\Delta P$ is not larger than zero, whether the direct-current error $\Delta I$ is larger than zero is further judged, the current is decreased when the direct-current error $\Delta I$ is larger than zero, and the current is increased when the direct-current error ΔI is not larger than zero.

The direct current input to the MPPT control unit 72 is a direct current acquired by subtracting from the converter input current Iconv a value obtained by dividing the converter input voltage Vconv by the resistance equivalent value k1. The resistance equivalent value k1 simulates a resistance connected to the input end of the power conversion apparatus in series.

That is, when the direct current acquired by subtracting from the converter input current Iconv the value obtained by dividing the converter input voltage Vconv by the resistance equivalent value k1 in this manner is input to the MPPT control unit 72, the control is equivalent to that in a configuration where a resistor is connected to the input end of the power conversion apparatus, and the resistor actually does not have to be connected.

Therefore, power loss can be prevented from being produced by the resistor connected to the input end of the power conversion apparatus, power generated by each photovoltaic array can be more efficiently utilized, and the balance of the current flowing through each power conversion apparatus can be adjusted similarly to a configuration in which an actual resistor were disposed.

The direct current (Iconv−Vconv/k1) input to the MPPT control unit 72 is subtracted from the reference current Iconv* output from the MPPT control unit 72, and a resultant current is input to the current control unit 74.

Based on the input difference value (Iconv*−(Iconv−Vconv/k1)), the current control unit 74 controls in such a manner that this difference value becomes zero and outputs a voltage direction value Vpwm_ref for the PWM comparator 76.

The PWM comparator 76 compares the voltage direction value Vpwm_ref output from the current control unit 74 with a triangular wave voltage Vtri and outputs a PWM signal Vpwm of a predetermined duty ratio. The PWM signal Vpwm is applied to the gate electrode of the switch Sw_chop in the DC-DC converter unit 10 depicted in FIG. 1.

That is, adjusting the duty ratio of the PWM signal Vpwm enables adjusting an ON period of the switch Sw_chop, and a value of the direct-current voltage output to the DC-AC inverter unit 20 can be adjusted by effecting boosting in the DC-DC converter unit 10.

As described above, according to the power conversion apparatus of this embodiment, it is possible to provide the power conversion apparatus that can be independently operated in parallel.

A power conversion apparatus according to a third embodiment will now be described with reference to the drawings. The power conversion apparatus according to this embodiment is different from the first embodiment in a control block that controls a gate terminal potential of a switch Sw_chop of a DC-DC converter unit 10.

Figure 8:
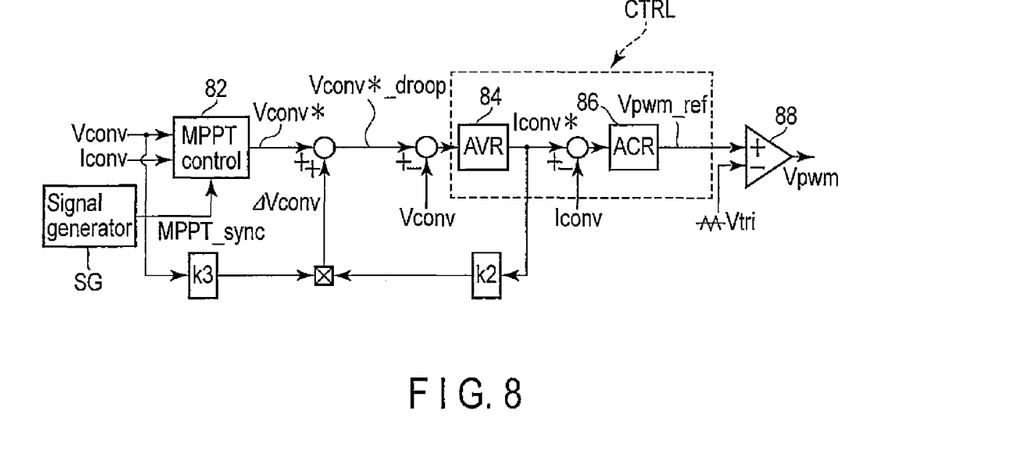
FIG. 8 is a block diagram for explaining a structural example of a controller of a DC-DC converter unit in a power conversion apparatus according to a third embodiment.

FIG. 8 shows an example of a control block that controls a gate terminal potential of the switch Sw_chop in the DC-DC converter 10 according to this embodiment. The control block depicted in FIG. 8 comprises an MPPT control unit 82 that receives a converter input voltage Vconv and a converter input current Iconv, a control unit CTRL including a voltage control unit (AVR: Automatic Voltage Regulator) 84 which performs PI control and a current control unit (ACR: Automatic Current Regulator) 86 which performs PI control, and a PWM comparator 88.

An operation of the MPPT control unit 82 is the same as the operation of the MPPT control unit 32 according to the first embodiment. An MPPT timing signal MPPT_sync is input to the MPPT control unit 82. The MPPT timing signal MPPT_sync adopted in this embodiment is generated from a zero-cross signal of a system voltage like the first embodiment.

Therefore, like the first embodiment, since the signal synchronized with the system voltage of the electric power system is adopted as the MPPT timing signal MPPT_sync, the MPPT control unit 32 can synchronously operate even though the power conversion apparatuses are connected in parallel. Therefore, each power conversion apparatus does not have to be provided with a communicating function, a complicated configuration can be avoided, and each power conversion apparatus can independently operate.

Furthermore, in case the system voltage cannot be obtained due to, e.g., a failure of the electric power system, a signal generator SG may be configured to be capable of generating the MPPT timing signal MPPT_sync. In this case, like the first embodiment, the power conversion apparatuses are connected through an auxiliary signal line, and the MPPT timing signal MPPT_sync output from the signal generator SG is input to all the power conversion apparatuses connected in parallel.

The MPPT control unit 82 outputs a reference voltage Vconv*. A feedback converter voltage value ΔVconv of droop control is added to the reference voltage Vconv* output from the MPPT control unit 82 to provide a voltage Vconv*_droop (=Vconv*+ΔConv), and a voltage (Vconv*_droop−Vconv) obtained by subtracting from this voltage the converter input voltage Vconv is input to the voltage control unit 84.

The feedback converter voltage value ΔVconv of the droop control is a value obtained by multiplying a sign k3 which represents minus (−) when larger than a maximum power point due to the MPPT control for fluctuating a voltage or a plus (+) when smaller than the maximum power point by a value obtained by multiplying the reference current Iconv* by a droop gain k2. The droop gain k2 simulates a resistance connected to an input end of the power conversion apparatus in series.

That is, when the value obtained by multiplying the reference current Iconv* by the resistance equivalent value k2 in this manner is added to or subtracted from the reference voltage Vconv*, the control is equivalent to that in a configuration where a resistor is connected to the input end of the power conversion apparatus, and the resistor actually does not have to be connected.

Therefore, power loss can be prevented from being produced by the resistor connected to the input end of the power conversion apparatus, power generated by each photovoltaic array can be more efficiently utilized, and the balance of the current flowing through each power conversion apparatus can be adjusted similarly to a configuration in which an actual resistor were disposed. It is to be noted that different values can be set with respect to the individual power conversion apparatuses as the resistance equivalent value k2.

The voltage control unit 84 outputs the reference current Iconv* by which an input difference between the voltage Vconv*_droop after the droop control and the converter input voltage Vconv (Vconv*_droop−Vconv) becomes zero. The reference current Iconv* is compared with the converter input current Iconv, and its difference (Iconv*−Iconv) is input to the current control unit 86.

Based on the input difference (Iconv*−Iconv), the current control unit 86 controls in such a manner that this difference value becomes zero and outputs a voltage direction value Vpwm_ref for the PWM comparator 88.

The PWM comparator 88 compares the voltage direction value Vpwm_ref output from the current control unit 86 with a triangular wave voltage Vtri and outputs a PWM signal Vpwm of a predetermined duty ratio. The PWM signal Vpwm is applied to a gate electrode of a switch Sw_chop in the DC-DC converter unit 10 depicted in FIG. 1.

That is, adjusting the duty ratio of the PWM signal Vpwm enables adjusting an ON period of the switch Sw_chop, and a value of the direct-current voltage output to the DC-AC inverter unit 20 can be adjusted by effecting boosting in the DC-DC converter unit 10.

As described above, according to the power conversion apparatus of this embodiment, it is possible to provide the power conversion apparatus that can be independently operated in parallel.

A power conversion apparatus according to a fourth embodiment will now be described with reference to the accompanying drawings. The power conversion apparatus according to this embodiment is different from the first embodiment in a control block that controls a gate terminal potential of a switch Sw_chop of a DC-DC converter unit 10.

Figure 9:
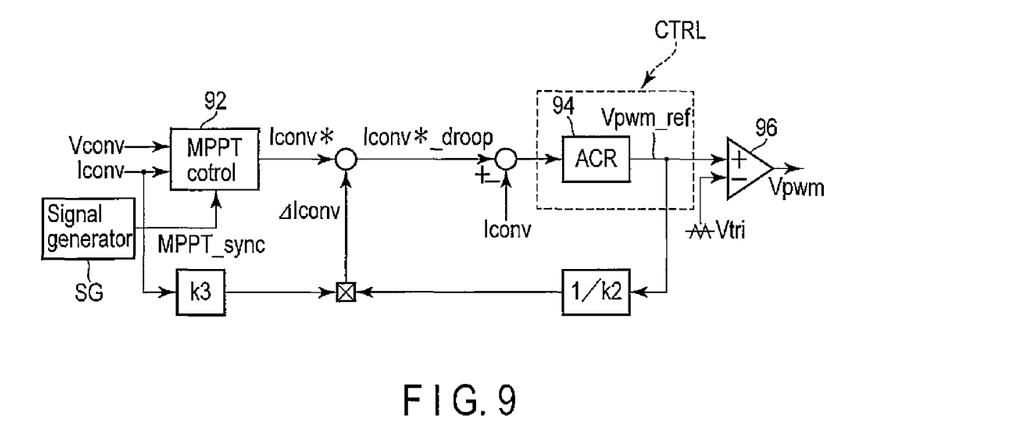
FIG. 9 is a block diagram for explaining a structural example of a controller of a DC-DC converter unit in a power conversion apparatus according to a fourth embodiment.

FIG. 9 shows an example of a control block that controls a gate terminal potential of the switch Sw_chop in the DC-DC converter unit 10. The control block depicted in FIG. 9 comprises an MPPT control unit 92 which receives a converter input voltage Vconv and a converter input current Iconv, a control unit CTRL including a current control unit (ACR: Automatic Current Regulator) 94 which performs PI control, and a PWM comparator 96.

An operation of the MPPT control unit 92 is the same as that of the MPPT control unit 72 according to the second embodiment. An MPPT timing signal MPPT_sync is input to the MPPT control unit 92. The MPPT timing signal MPPT_sync adopted in this embodiment is generated from a zero-cross signal of a system voltage like the first embodiment.

Therefore, like the first embodiment, since the signal synchronized with a system voltage of an electric power system is adopted as the MPPT timing signal MPPT_sync, the MPPT control unit 92 can synchronously operate even if the power conversion apparatuses are connected in parallel. Therefore, the power conversion apparatus does not have to be provided with a communicating function, a complicated configuration can be avoided, and the individual power conversion apparatuses can independently operate.

Furthermore, in case the system voltage cannot be obtained due to, e.g., a failure of the electric power system, a signal generator SG may be configured to be capable of generating the MPPT timing signal MPPT_sync. In this case, like the first embodiment, the power conversion apparatuses are connected through an auxiliary signal line, and the MPPT timing signal MPPT_sync output from the signal generator SG is input to all the power conversion apparatuses connected in parallel.

The MPPT control unit 92 outputs a reference current Iconv*. A feedback converter current value ΔIconv of droop control is added to the reference current Iconv* output from the MPPT control unit 92 to provide a current Iconv*_droop (=Iconv*+ΔIconv), and a current (Iconv*_droop−Iconv) obtained by subtracting from this voltage the converter input current Iconv is input to the voltage control unit 94.

The feedback converter current value ΔIconv of the droop control performs a calculation by multiplying a sign k3 which represents plus (+) when larger than a maximum power point due to the MPPT control for fluctuating a current or minus (−) when smaller than the maximum power point with a value which is obtained by multiplying a voltage direction value Vpwm_ref by a droop gain 1/k2. k2 of the droop gain 1/k2 simulates a resistance connected to an input end of the power conversion apparatus in series.

That is, when the value obtained by multiplying the voltage direction value Vpwm_ref by the droop gain 1/k2 in this manner is added to or subtracted from the reference current Iconv*, the control is equivalent to that in a configuration where a resistor is connected to the input end of the power conversion apparatus, and the resistor actually does not have to be connected.

Therefore, power loss can be prevented from being produced by the resistor connected to the input end of the power conversion apparatus, power generated by each photovoltaic array can be more efficiently utilized, and the balance of the current flowing through each power conversion apparatus can be adjusted similarly to a configuration in which an resistor were disposed. It is to be noted that different values can be set with respect to the individual power conversion apparatuses as the resistance equivalent value k2.

Based on an input difference (Iconv*_droop−Iconv) between the current Iconv*_droop after the drop control and the converter input current Iconv, the current control unit 94 controls in such a manner that this difference becomes zero and outputs a voltage direction value Vpwm_ref for the PWM comparator 96.

The PWM comparator 96 compares the voltage direction value Vpwm_ref output from the current control unit 94 with a triangular wave voltage Vtri and outputs a PWM signal of a predetermined duty ratio. The PWM signal Vpwm is applied to a gate electrode of the switch Sw_chop in the DC-DC converter unit 10 depicted in FIG. 1.

That is, adjusting the duty ratio of the PWM signal Vpwm enables adjusting an ON period of the switch Sw_chop, and a value of the direct-current voltage output to the DC-AC inverter unit 20 can be adjusted by effecting boosting in the DC-DC converter unit 10.

As described above, according to the power conversion apparatus of this embodiment, it is possible to provide the power conversion apparatus that can be independently operated in parallel.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power conversion apparatus comprising:
a first input terminal connected to a positive electrode of a direct-current power source;
a second input terminal connected to a negative electrode of the direct-current power source;
a first output terminal electrically connected to the first input terminal;
a second output terminal electrically connected to the second input terminal;
a coil connected between the first input terminal and the first output terminal in series;
a diode connected in a forward direction from an output end of the coil to the first output terminal;
a switch configured to change over connection between the second input terminal and the output end of the coil;

a capacitor connected between the first output terminal and the second output terminal;

a controller configured to output a signal for controlling ON and OFF of the switch; and a DC-AC inverter unit which converts direct-current power output from each of the first output terminal and the second output terminal into alternating-current power and outputs the alternating-current power, wherein the controller comprises: an MPPT control unit configured to follow a maximum power point with a period based on a zero-cross detection signal of a system voltage based on an input signal acquired by subtracting a value obtained by multiplying a droop gain simulating drooping characteristics; a control unit configured to output a voltage direction value in such a manner that a difference between a reference output from the MPPT control unit and the input signal becomes zero; and a PWM comparator configured to output a PWM signal based on the voltage direction value and a triangular wave voltage.

2. A power conversion apparatus comprising:

a first input terminal connected to a positive electrode of a direct-current power source;

a second input terminal connected to a negative electrode of the direct-current power source;

a first output terminal electrically connected to the first input terminal;

a second output terminal electrically connected to the second input terminal;

a coil connected between the first input terminal and the first output terminal in series;

a diode connected in a forward direction from an output end of the coil to the first output terminal;

a switch configured to change over connection between the second input terminal and the output end of the coil;

a capacitor connected between the first output terminal and the second output terminal;

a controller configured to outputs a signal for controlling ON and OFF of the switch; and a DC-AC inverter unit configured to convert direct-current power output from each of the first output terminal and the second output terminal into alternating-current power and output the alternating-current power, wherein the controller comprises: an MPPT control unit configured to follow a maximum power point with a period based on a zero-cross detection signal of a system voltage on the basis of an input signal; a control unit configured to output a voltage direction value in such a manner that a difference between a value obtained by subtracting a value simulating drooping characteristics from a reference output from the MPPT control unit and the input signal becomes zero; and a PWM comparator configured to output a PWM signal based on the voltage direction value and a triangular wave voltage.

3. The apparatus according to claim 1, wherein the MPPT control unit configured to output a voltage reference, and the control unit comprises: a voltage control unit configured to output a current reference in such a manner that the input difference becomes zero; and a current control unit configured to output the voltage direction value in such a manner that a difference between the current reference and an input current signal becomes zero.

4. The apparatus according to claim 2, wherein the MPPT control unit configured to output a voltage reference, and the control unit comprises: a voltage control unit configured to output a current reference in such a manner that the input difference becomes zero; and a current control unit configured to output the voltage direction value in such a manner that a difference between the current reference and an input current signal becomes zero.

5. The apparatus according to claim 1, wherein the MPPT control unit configured to output a current reference, and the control unit comprises a current control unit configured to output the voltage direction value in such a manner that an input difference becomes zero.

6. The apparatus according to claim 2, wherein the MPPT control unit configured to output a current reference, and the control unit comprises a current control unit configured to output the voltage direction value in such a manner that an input difference becomes zero.

7. The apparatus according to claim 1, further comprising a signal generator configured to generate a timing signal for controlling operation timing of the MPPT control unit.

8. The apparatus according to claim 2, further comprising a signal generator configured to generate a timing signal for controlling operation timing of the MPPT control unit.

9. The apparatus according to claim 3, further comprising a signal generator configured to generate a timing signal for controlling operation timing of the MPPT control unit.

10. The apparatus according to claim 4, further comprising a signal generator configured to generate a timing signal for controlling operation timing of the MPPT control unit.

* * * * *